United States Patent
Rodgers et al.

(10) Patent No.: US 11,408,516 B1
(45) Date of Patent: Aug. 9, 2022

(54) ADJUSTABLE REGULATOR ANTI-SEIZE VALVE

(71) Applicants: Ian Rodgers, Itasca, IL (US); Brandon Cole, Itasca, IL (US); Moises Contreras, Itasca, IL (US)

(72) Inventors: Ian Rodgers, Itasca, IL (US); Brandon Cole, Itasca, IL (US); Moises Contreras, Itasca, IL (US)

(73) Assignee: Robertshaw Controls Company, Itasca, IL (US)

( * ) Notice: Subject to any disclaimer, the term of this patent is extended or adjusted under 35 U.S.C. 154(b) by 0 days.

(21) Appl. No.: 17/329,432

(22) Filed: May 25, 2021

Related U.S. Application Data

(60) Provisional application No. 63/171,806, filed on Apr. 7, 2021.

(51) Int. Cl.
*F16K 1/42* (2006.01)
*F16K 1/48* (2006.01)

(52) U.S. Cl.
CPC . *F16K 1/42* (2013.01); *F16K 1/48* (2013.01)

(58) Field of Classification Search
CPC .................................... F16K 1/42; F16K 1/48
See application file for complete search history.

(56) References Cited

U.S. PATENT DOCUMENTS

| | | | | |
|---|---|---|---|---|
| 4,240,464 A * | 12/1980 | Schink | ............... | G05D 16/0669 137/116.5 |
| 5,249,773 A * | 10/1993 | Feld | .......................... | F16K 1/38 261/DIG. 38 |
| 5,755,254 A * | 5/1998 | Carter | ................ | G05D 16/0655 137/340 |
| 9,004,097 B2 * | 4/2015 | Crawford | ............. | G05D 16/163 251/285 |
| 2004/0231726 A1 * | 11/2004 | Nakajima | ............... | B60L 58/33 137/505.18 |
| 2008/0047619 A1 * | 2/2008 | Pechtold | .............. | G05D 16/107 137/505.41 |
| 2014/0290759 A1 * | 10/2014 | Ishikawa | .............. | G05D 16/107 137/505 |

* cited by examiner

*Primary Examiner* — Patrick C Williams
(74) *Attorney, Agent, or Firm* — Miller & Martin PLLC; Stephen J. Stark

(57) ABSTRACT

A regulator valve has an anti-seize feature when in the hard stop position. The valve is providing with a biasing force away from the hard stop position when in the hard stop position sufficient to prevent seizure of the drive screw in the hard stop position. This biasing force may be provided by a resilient member and/or a plastic, instead of a metal, adjusting screw which may provide sufficient resiliency to prevent seizing in the hard stop position. A resilient member could be a washer such as a spring washer, a wave washer, or even a compressible flat.

14 Claims, 7 Drawing Sheets

ADJUSTABLE REGULATOR ANTI-SEIZE VALVE

CLAIM OR PRIORITY

This application claims the benefit of U.S. Provisional Application No. 63/171,806 filed Apr. 7, 2021, which is incorporated by reference herein in its entirety.

FIELD OF THE INVENTION

The present invention relates to gas valves and more particularly to gas valves having an on off function as well as a gas pressure regulator function.

BACKGROUND OF THE INVENTION

Gas regulator valves often include a main valve that may be activated controlled by a servo regulator or directly by an adjustable spring force. When spring force is utilized, particularly in electrically controlled valves, the spring force can be changed with the use of a stepper motor or other electrically driven motor. The motor can compress the diaphragm spring when turning one direction or release it in the other to therefore change the pressure exerted on the diaphragm and thus, the regulator setting.

In many uses, such as with gas cooking valves, these motors do not normally have positional feedback due to cost of such systems, so the motor is often driven into a stop and then the starting position is known so the regulator range can be known and positioned accordingly. Unfortunately, driving motor into a stop has a tendency to have the motor or drive screw seize in place. The torque of the motor is then unable to move the drive screw with a consequential loss of adjustability and the valve being stuck in an off position. This particular problem can be even worse at elevated temperatures.

One way to address this problem would be to use positional feedback with the motors and associated electronics. Unfortunately, the cost of a feedback system in electronics would significantly increase the costs to the user. Another possibility could be to drive the motor into a stop for a short period of time and then immediately back off the stop. While this could be performed, there are a number of issues. First, one still drives the motor and/or drive screw into the stop where the valve could be stuck. Second, the exact position could be lost as the drive screw might get stuck for some time at the stop and then free itself, or it could back off immediately the full signal amount. Then, the exact position could be somewhere in-between those two positions, if not stuck.

What is needed is a way to consistently position the lifter applying the spring force on the diaphragm so that it does not stick against a hard stop and the position is repeatedly known.

SUMMARY OF THE INVENTION

It is an object of many embodiments of the present invention to provide an improved valve having a lifter with a known position that is not stuck against a hard stop.

It is another object of many embodiments of the present invention to provide an improved gas valve having on/off and regulator functions which has a reduced likelihood of sticking at a hard stop position.

Accordingly, in accordance with many embodiments of the present invention, an improved valve can be provided to the marketplace. While springs are common in gas valves for use in acting against regulators so that the regulator is providing a desired amount of flow through the valve, what is not believed to have ever been done is to put a spring on the opposite side of a lifter drive screw, opposite the regulator so that should the valve be directed to a hard stop the stop-freeing biased spring tends to push the lifter and drive screw with the motor off the hard stop such as particularly in the case of a stepper motor driving the lifter to a hard stop position. Accordingly, when a stepper motor is de-energized, the bias force is sufficient to back off the drive screw by at least the clearance between the threads after the motor has been de-energized. There are many types of biased members that can be utilized for this such as a wave washer, O-ring, compressible flat, spring washers or other biasing members that have sufficient resiliencies so that when the stepper motor or manual force is released, the bias then moves the lifter at lease slightly away from the hard stop so that it does not bind or stick, and the position is known. The biasing members could act directly or indirectly on the drive screw, the lifter, or the motor for many embodiments possibly utilizing threads that cooperate with the drive screw as a location to fix elevational movement of the biasing member, at least temporarily.

The spring force used for preferably compressive site such as a wave washer or O-ring, conventional coil spring may not be particularly desirable for many applications because coil springs can be entangled with the rotary motion of the drive screw. The wave washer compressible flat washer or O-ring material can be steel, nylon, silicone, etc., as long as it meets the temperature requirements and aids in the spring back of the drive screw. These and other embodiments may have an adjusting screw which may be at least somewhat resilient to provide a desired biasing force in the hard stop position, such as those made of plastics like Low Density Polyethylene (LDPE) or polyvinyl chloride (PVC) to at least assist, if not provide by itself, the desired anti-seizing effect when the stepping motor is secured (or at least force applied by the stepping motor is secured, so that a known position is provided in an anti-seized condition).

BRIEF DESCRIPTION OF THE DRAWINGS

The particular features and advantages of the inventions with other objects will become apparent from the following description taken in connection with the accompanying drawings in which.

DETAILED DESCRIPTION OF THE PREFERRED EMBODIMENT

Figure 1:
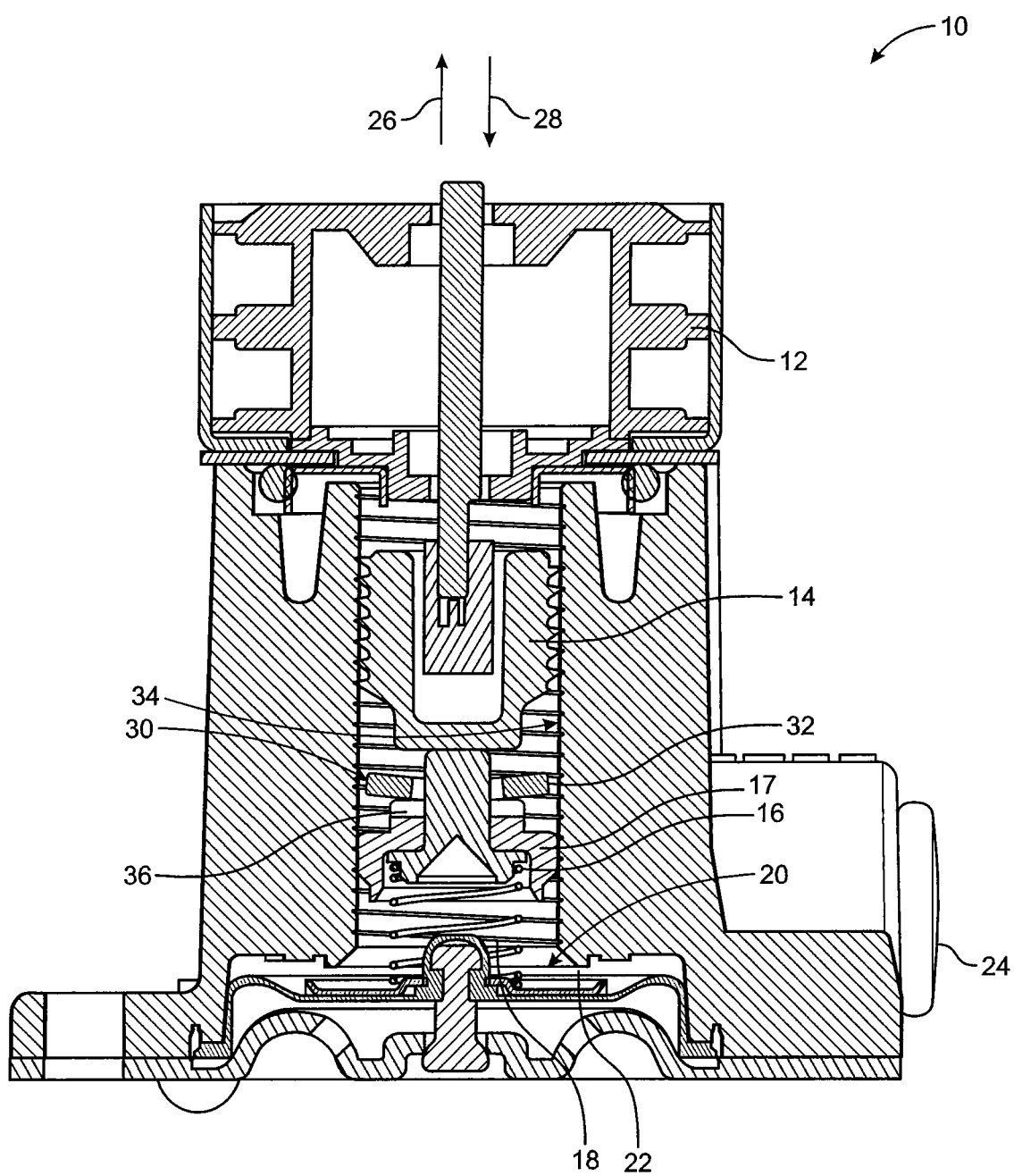
FIG. 1 is a cross sectional view of a gas valve of the present preferred embodiment of the present invention.
Figure 2:
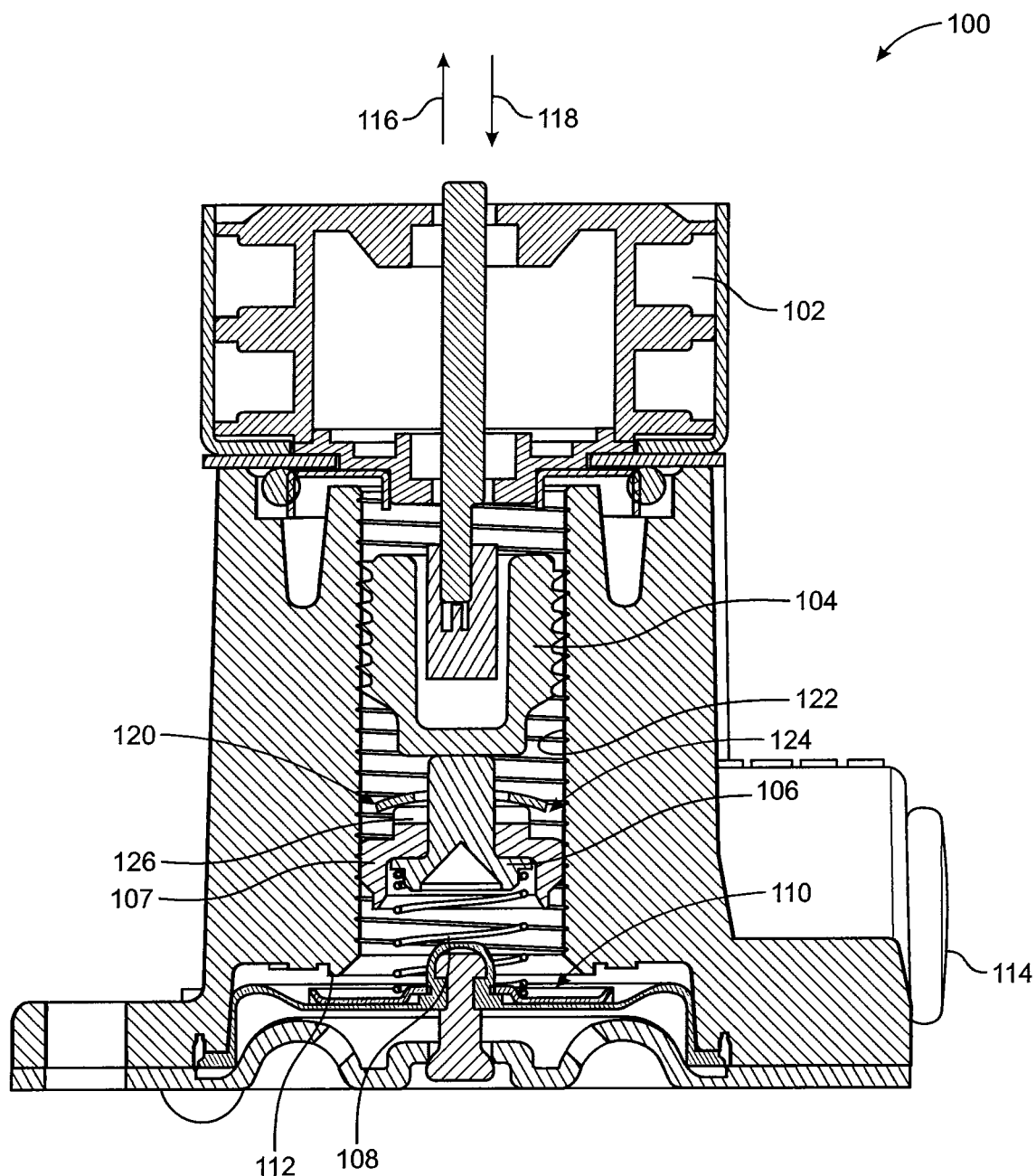
FIG. 2 is a cross sectional view of a gas valve of an alternative preferred embodiment of the present invention.
Figure 3:
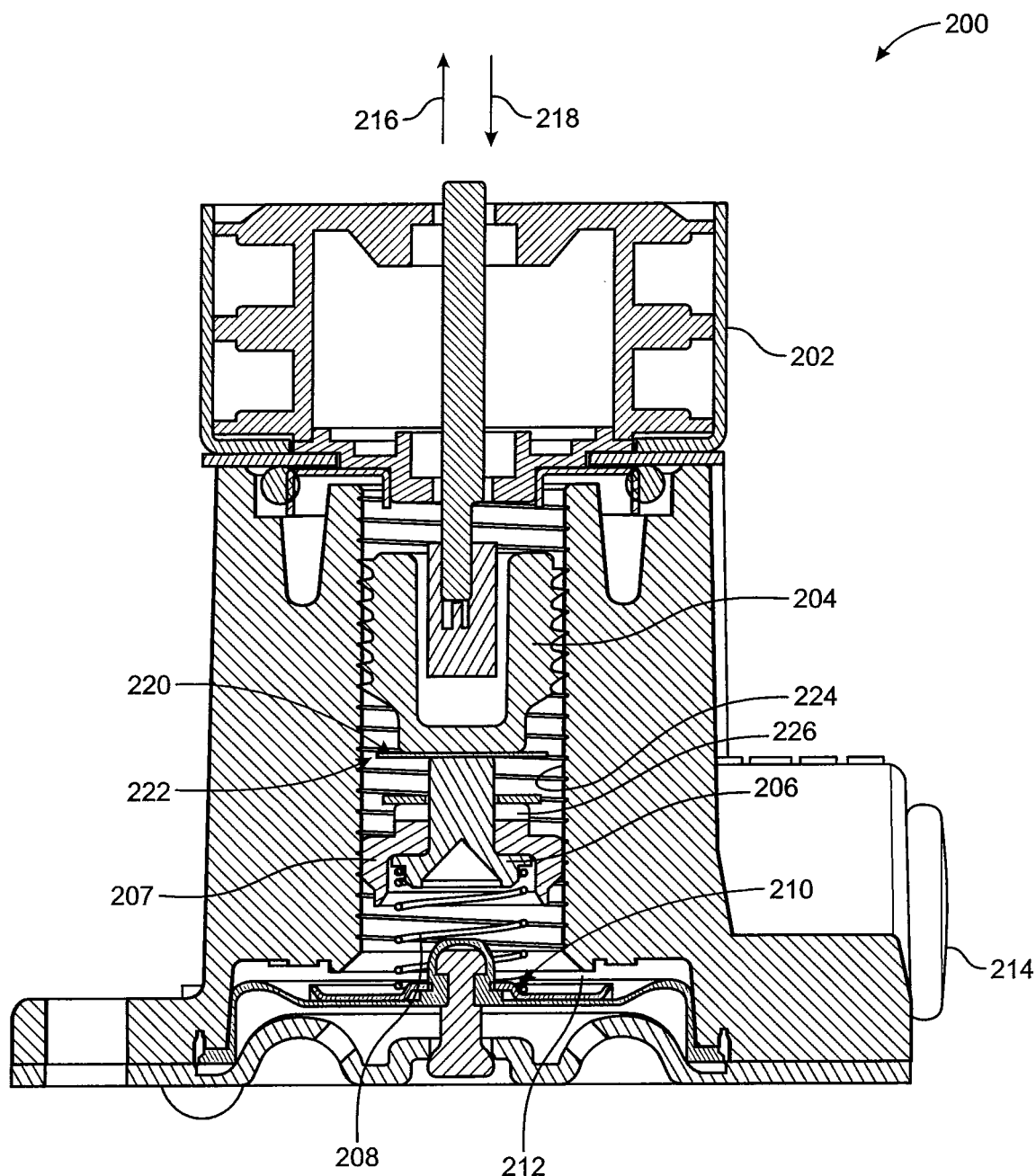
FIG. 3 is a cross sectional view of a gas valve of a second alternative preferred embodiment of the present invention.
Figure 4:
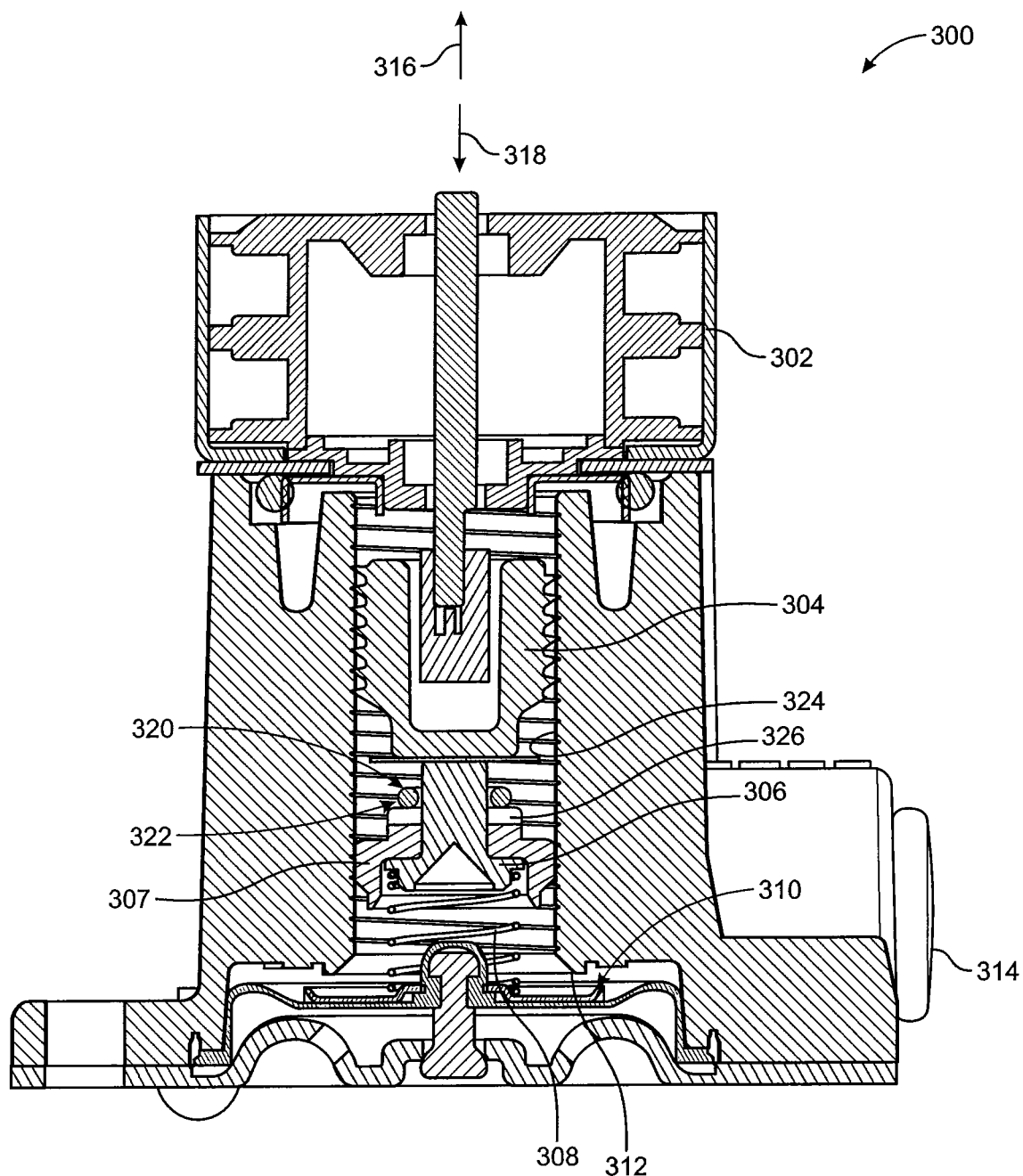
FIG. 4 is a cross sectional view of a gas valve of a third alternative preferred embodiment of the present invention.
Figure 5:
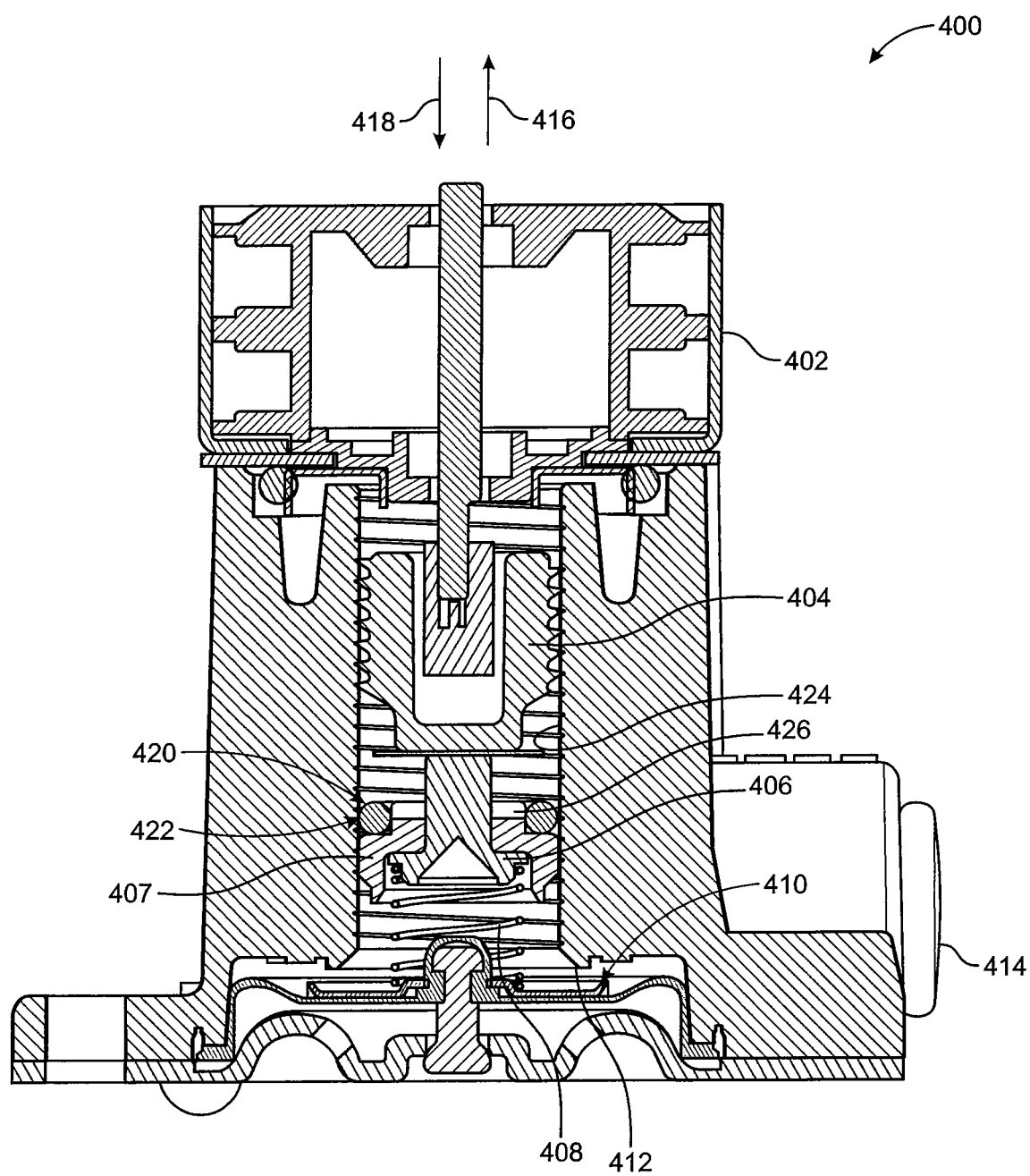
FIG. 5 is a cross sectional view of a gas valve of a fourth alternative preferred embodiment of the present invention.
Figure 6:
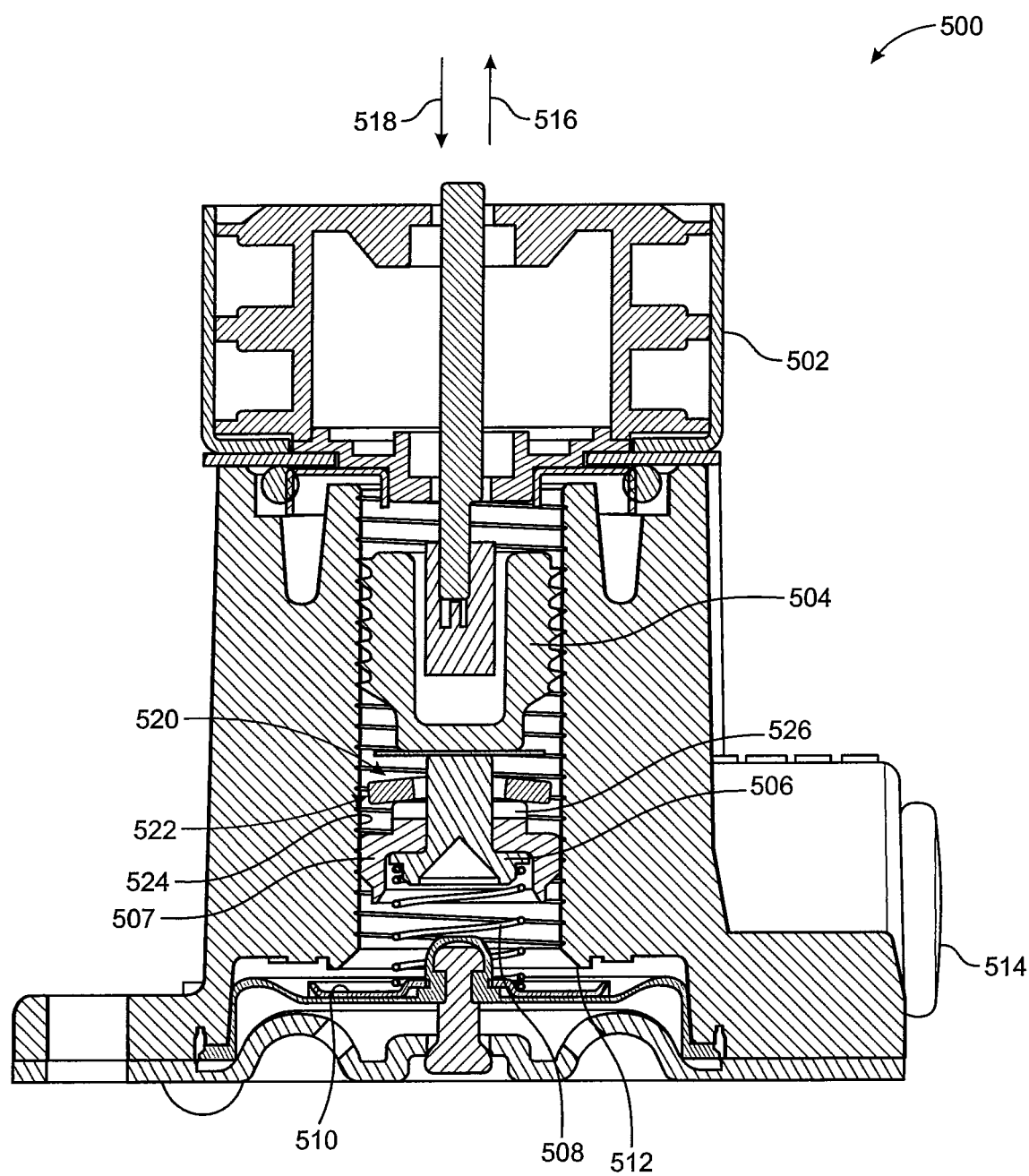
FIG. 6 is a cross sectional view of a gas valve of a fifth alternative preferred embodiment of the present invention.

FIGS. 1 through 6 show various embodiments of gas valves 10,100,200,300,400,500. All these valves are shown with a stepper motor 12,102,202,302,402,502, such as an electric or electronic stepper motor, a driving a drive screw 14,104,204,304,404,504. The drive screws are useful to move a lifter 16,106,206,306,406,506. The lifter can apply a selected amount of pressure to a spring such as coil springs 18,108,208,308,408,508 which preferably provides a pressure force against regulators 20,110,210,310,410,510. This can cause the regulators 20,110,210,310,410,510 to unseat from the seats 22,112,212,312,412,512 at specific pressures so as to adjust the amount of flow through the valves 10,100,200,300,400,500 the inlet/outlet port 24,114,214, 314,414,514 being illustrated and the other being obscured from view in these views, but are well known in the art of regulating valves 10,100,200,300,400,500.

The valves 10,100,200,300,400,500 also have a position in which the drive screw 304 is backed sufficiently away in the direction 26,116,216,316,416,516 so that the regulators 20,110,210,310,410,510 seat against the seats 22,112,212, 312,412,512. Normally for many applications the stepper motors 12,102,202,302,402,502 will continue to move the drive screws 14,104,204,304,404,504 to a back seat or a hard stop position so that the valves 10,100,200,300,400,500 have a known position of the lifters 16,106,206,306,406,506 and the drive screws 14,104,204,304,404,504.

As can be seen from the various embodiments, the coil springs 18,108,208,308,408,508 exert a pressure or force against the regulator 20,110,210,310,410,510 in the directions 28,118,218,318,418,518 illustrated by arrows or in the direction opposite to the directions 26,116,216,316,416,516. The opposite force is applied to the lifters 16,106,206,306, 406,506.

The applicant is providing an improvement to the valves 10,100,200,300,400,500 to provide a biasing force to the lifters 16,106,206,306,406,506 and/or the drive screws 14,104,204,304,404,504 in directions 28,118,218,318,418, 518 either all the time or when the drive screw 14,104,204, 304,404,504 and/or lifter 16,106,206,306,406,506 has reached the hard stop position such as the off configuration. With the stepper motors 12,102,202,302,402,502 de-energized, the resilient members illustrated as one or more of an inverted wave type washer 30, wave washer 120 a compressible flat 220 whether it be a solid compressible flat or have a donut in configuration with the bore 303, a first O-ring 220, a lifter 320 or a second O-ring 420 positioned radially outwardly of where the first O-ring 220 might be located and/or a spring washer 520 or other resilient member could be utilized to bias any of the drive screws 14,104, 204,304,404,504 in the directions 28,118,218,318,418,518 toward the regulators 20,110,210,310,410,510. Biasing or resilient members 30,120,220,320,420,520 as well as drive screw stop 26,126,226,326,426,526, are located opposite of coil spring 18,108,208,308,408,508, from at least a portion of lifter 16,106,206,306,406,506.

Any of the biasing members illustrated or others tend to push once pressure is released whether that be electrically provided pressure through any of the various stepper motors 12,102,202,302,402,502 or by a manual knob or otherwise is released. The biasing members 30,120,220,320,420,520 push the drive screws 14,104,204,304,404,504, drive screw stop 26,126,226,326,426,526, and/or lifters 16,106,206,306, 406,506 either directly or indirectly away from the hard stop position in the direction 28,118,218,318,418,518 at least slightly (or at least off of a seized condition) so that the drive screws 14,104,204,304,404,504, and/or the lifters 16,106, 206,306,406,506 do not get stuck in the hard stop position.

As can be seen by the various embodiments of FIGS. 1-5, the resilient and/or biasing member illustrated as described above or otherwise, is preferably somewhat compressive in nature such as a wave washer 120, inverted wave washer 30, a compressible flat 220 such as a washer whether solid or with a bore therethrough, an O-ring of various diameters such as first and second O-rings 320,420 or a spring washer 520 or other suitable material such as to provide a resilient member acting in the directions 28,118,218,318,418,518 which applies force in opposite directions to at least a portion of lifter 16,106,206,306,406,506 normally applied by the springs 18,108,208,308,408,508 and operate from an opposite side of at least the lifters 16,106,206,306,406,506 relative to the regulators 20,110,210,310,410,510 and not also opposite the drive members 14,104,204,304,404,504. The resilient members could be steel, nylons, silicone or other materials as long as they are engineered to meet the temperature requirements of the valves 10,100,200,300,400, 500 and provide a sufficient resilient force to prevent the drive screws 14,104,204,304,404,504 from sticking at the hard stop position. They may move with the drive screws 14,104,204,304,404,504 through a range of motion and/or may be contacted at the hard stops as illustrated.

This technology is believed to be counter-intuitive in that the majority of the effort of the gas valves 10,110,210,310, 410,510 is directed towards providing the correct amount of force on the springs 18,108,208,308,408,508 so as to bias which provides forces against the lifters 16,106,206, 406,506 in the direction 26,116,216,316,416,516 which is directly opposite the direction of the biasing members illustrated as 30,120,220,320,420,520 which operate in the directions 28,118,218,318,418,518 which are directly opposite the directions 26,116,216,316,416,516. Those of ordinary skill in the art will understand how this improvement provides a huge advantage over the cost of electronic controlled feedback with and/or motor drive screws or other methodologies to attempt to prevent valves from getting stuck in the hard stop positions.

For some embodiments, the resilient member such as 30,120,220,320,420,520 can contact the threads such as threads 34,124,224,324,424,524 of the valves 10,100,200, 300,400,500 through which the drive screws 14,104,204, 304,404,504 operate at edges 32,122,222,322,422,522 of the biasing or resilient member(s) 30,120,220,320,420,520, such as at outer edges. Other embodiments may act on the resilient members 30,120,220,320,420,520 at other locations other than the interior threads 34,124,224,324,424,524 of the valve 10,100,200,300,400,500 so as to provide a stop against which the resilient members 30,120,220,320,420, 520 may push against to impart force in the directions 28,118,218,318,418,518 (or at least have a vector component in those directions 28,118,218,318,418,518) as shown in the Figures.

Figure 7:
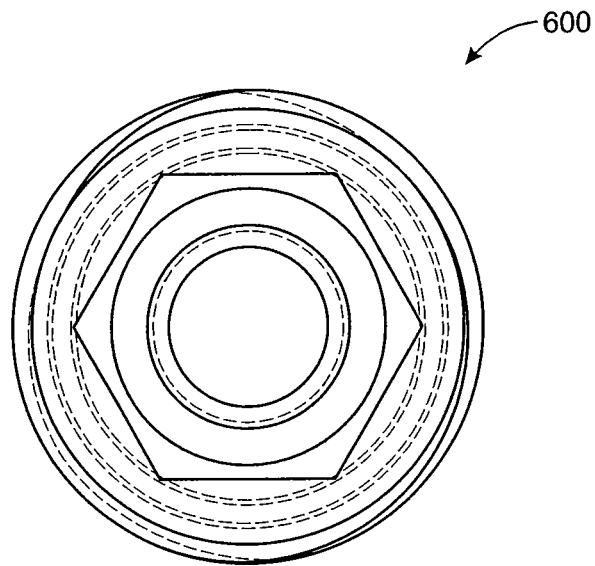
FIG. 7 is a top view of an embodiment of an adjusting screw shown in FIGS. 1-6.
Figure 8:
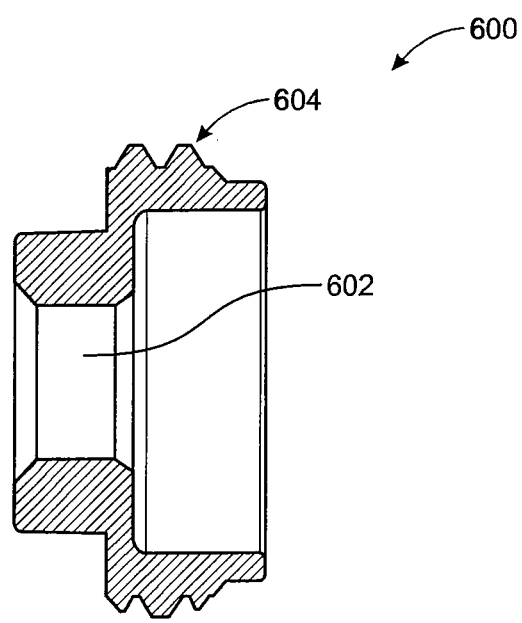
FIG. 8 is a cross sectional view of the adjusting screw shown in FIG. 7.

Drive screws 14,104,204,304,404,504 are shown acting on lifters 16,106,206,306,406,506 in the various embodiments. Adjustment screws such as 600 shown in FIGS. 7 and 8 could be or replace, if metal, adjusting screws 17,107,207, 307,407,507 shown in FIGS. 1-6. Adjustment screw 600 is a plastic instead of a metal screw for at least some embodiments particularly those without resilient members 30,120, 220,320,420,520. Suitable materials include at least low density polyethylene (LDPE) and polyvinyl chloride (PVC). Even without a biasing material such as an O-ring or washer being any of the resilient members 30,120,220,320,420,520, the plastic adjusting screw 600 may provide sufficient resiliency against a stop, either directly or indirectly, such as against threads 34,124,224,324,424,524, or may be utilized in combination with any of the resilient members 30,120, 220,320,420,520. The resiliency of the adjusting screw 600, when made of a material more resilient than metal, like brass, such as plastic, may provide sufficient resiliency or biasing force so that when a stop, such as drive screw stop 36,126,326,426,526 is encountered and pressure released, the adjusting screw 600 then moves the drive screw 14,104, 204,304,404,504 off of a seized condition with the stop. Physical movement may be all but imperceptible, but is at least sufficient to prevent the valve 10,100,200,300,400,500 from seizing in the hard stop position. The drive screw stop 36,126,226,326,426,526, is preferably located opposite at least a portion of lifters 16,106,206,306,406,506 from the coil spring 18,108,208,308,408,508 of the valve 10,110,210, 310,410,510.

The adjustment screws 600 have exterior threads 604 which may cooperate with interior threads 35,124,224,324, 424,524 of the valves 10,100,200,300,400,500, etc. The adjustment screws 600 also have a bore through which the lifter 16,106,206,306,406,506 passes.

Numerous alterations of the structure herein disclosed will present themselves to those skilled in the art. However, it is to be understood that the present disclosure relates to the preferred embodiment of the invention which is for purposes of illustration only and not to be construed as a limitation of the invention. All such modifications which do snot depart from the spirit of the invention are intended to be included within the scope of the appended claims.

Having set forth the nature of the invention, what is claimed herein is:

1. A regulating valve comprising:
   a stepper motor coupled to a drive screw;
   a lifter operably coupled to the drive screw, said lifter surrounded by and in contact with an adjusting screw;
   a regulator spring applying a first force against the lifter in a first direction and against a regulator in a second direction, the first direction being opposite to the second direction;
   a drive screw stop located opposite a portion of the lifter from the regulator spring; and
   a biasing member configured to contact the drive screw stop or the adjusting screw, with the biasing member applying a force against the drive screw thereby preventing the drive screw and lifter from sticking in a hard stop position when the stepper motor is secured in the hard stop position.

2. The regulating valve of claim 1 wherein the adjusting screw is plastic.

3. The regulating valve of claim 1 wherein the adjusting screw is one of low density polyethylene (LDPE) and polyvinyl chloride (PVC).

4. The regulating valve of claim 1 wherein the biasing member is a washer and is selected from the group of a wave washer and a spring washer.

5. The regulating valve of claim 4 wherein the biasing member is a wave washer and is an inverted wave washer.

6. The regulating valve of claim 1 wherein the biasing member is a compressible flat.

7. The regulating valve of claim 6 wherein the compressible flat contacts the lifter in the hard stop position.

8. A regulating valve comprising:
   a stepper motor coupled to a drive screw;
   a lifter operably coupled to the drive screw, said lifter surrounded by and in contact with an adjusting screw;
   a regulator spring applying a first force against the lifter in a first direction and against a regulator in a second direction, the first direction being opposite to the second direction;
   a drive screw stop located opposite a portion of the lifter from the regulator spring; and
   a biasing member configured to contact the drive screw stop or the adjusting screw, with the biasing member applying a force against the drive screw thereby preventing the drive screw and lifter from sticking in a hard stop position when the stepper motor is secured in the hard stop position;
   wherein the biasing member contacting the drive screw stop is one of a washer and an O-ring.

9. A regulating valve comprising:
   a stepper motor coupled to a drive screw;
   a lifter operably coupled to the drive screw, said lifter surrounded by and in contact with an adjusting screw;
   a regulator spring applying a first force against the lifter in a first direction and against a regulator in a second direction, the first direction being opposite to the second direction;
   a drive screw stop located opposite a portion of the lifter from the regulator spring; and
   a biasing member configured to contact the drive screw stop or the adjusting screw, with the biasing member applying a force against the drive screw thereby preventing the drive screw and lifter from sticking in a hard stop position when the stepper motor is secured in the hard stop position;
   wherein the biasing member is an O-ring contacting the drive screw stop in the hard stop position.

10. A regulating valve comprising:
    a stepper motor coupled to a drive screw;
    a lifter operably coupled to the drive screw, said lifter surrounded by and in contact with an adjusting screw;
    a regulator spring applying a first force against the lifter in a first direction and against a regulator in a second direction, the first direction being opposite to the second direction;
    a drive screw stop located opposite a portion of the lifter from the regulator spring; and
    a biasing member configured to contact the drive screw stop or the adjusting screw, with the biasing member applying a force against the drive screw thereby preventing the drive screw and lifter from sticking in a hard stop position when the stepper motor is secured in the hard stop position;
    wherein the biasing member is an O-ring contacting the adjusting screw in the hard stop position.

11. A regulating valve comprising:
    a stepper motor coupled to a drive screw;
    a lifter operably coupled to the drive screw, said lifter surrounded by and in contact with an adjusting screw;
    a regulator spring applying a first force against the lifter in a first direction and against a regulator in a second direction, the first direction being opposite to the second direction;
    a drive screw stop located opposite a portion of the lifter from the regulator spring; and
    a biasing member configured to contact the drive screw stop or the adjusting screw, with the biasing member applying a force against the drive screw thereby preventing the drive screw and lifter from sticking in a hard stop position when the stepper motor is secured in the hard stop position;
    wherein the drive screw has exterior threads which cooperate with interior threads of the valve, and the adjusting screw has exterior threads which cooperate with the interior threads of the valve.

12. A regulating valve comprising:
a stepper motor coupled to a drive screw;
a lifter operably coupled to the drive screw, said lifter surrounded by and in contact with an adjusting screw;
a regulator spring applying a first force against the lifter in a first direction and against a regulator in a second direction, the first direction being opposite to the second direction;
a drive screw stop located opposite a portion of the lifter from the regulator spring; and
a biasing member configured to contact the drive screw stop or the adjusting screw, with the biasing member applying a force against the drive screw thereby preventing the drive screw and lifter from sticking in a hard stop position when the stepper motor is secured in the hard stop position;
wherein the lifter passes through a bore in the adjusting screw.

13. The regulating valve of claim 12 wherein the lifter contacts the drive screw in the hard stop position.

14. The regulating valve of claim 13 wherein the biasing member contacts the interior threads of the valve and the drive screw stop in the hard stop position.

* * * * *